United States Patent
Anderfaas et al.

(10) Patent No.: US 9,457,853 B2
(45) Date of Patent: Oct. 4, 2016

(54) TRACK TENSIONER

(71) Applicant: MillenWorks, Tustin, CA (US)

(72) Inventors: Eric N. Anderfaas, Westminster, CA (US); Matthew M. O'Brien, Hermosa Beach, CA (US)

(73) Assignee: MillenWorks, Tustin, CA (US)

( * ) Notice: Subject to any disclaimer, the term of this patent is extended or adjusted under 35 U.S.C. 154(b) by 681 days.

(21) Appl. No.: 13/830,638

(22) Filed: Mar. 14, 2013

(65) Prior Publication Data
US 2014/0265549 A1 Sep. 18, 2014

(51) Int. Cl.
*B62D 55/30* (2006.01)

(52) U.S. Cl.
CPC .................... *B62D 55/305* (2013.01)

(58) Field of Classification Search
CPC ..................... B62D 55/30; B62D 55/305
USPC .......................... 305/143, 145, 156
See application file for complete search history.

(56) References Cited

U.S. PATENT DOCUMENTS

| | | | | |
|---|---|---|---|---|
| 3,642,041 A * | 2/1972 | Hamilton | ............. | A01G 23/097 144/338 |
| 3,741,331 A * | 6/1973 | Kowalik | ............... | E02F 9/0841 180/9.44 |
| 3,789,942 A * | 2/1974 | Kowalik | ............ | B62D 55/0655 180/9.44 |
| 3,910,649 A * | 10/1975 | Roskaft | .................. | B62D 55/30 180/9.1 |
| 3,974,890 A * | 8/1976 | Noble | .................... | B62M 27/02 180/193 |
| 4,127,180 A * | 11/1978 | Coffman | ................ | B62D 55/30 180/6.48 |
| 4,854,650 A * | 8/1989 | Getz | ...................... | B62D 55/30 267/64.26 |
| 4,898,257 A * | 2/1990 | Brandstadter | ...... | B60G 17/0152 180/22 |
| 5,097,916 A * | 3/1992 | Brandstadter | ...... | B60G 17/0152 180/22 |
| 5,165,765 A * | 11/1992 | Baylor | .................. | B62D 55/30 305/144 |
| 5,289,388 A * | 2/1994 | Dahroug | ............... | B22D 17/32 700/281 |
| 5,334,106 A * | 8/1994 | Purcell | ...................... | F16H 7/14 305/145 |
| 5,473,990 A * | 12/1995 | Anderson | ............. | A63G 31/16 104/154 |
| 5,482,126 A * | 1/1996 | Bouit | ................... | B62D 55/305 180/9.1 |
| 5,906,150 A * | 5/1999 | Sakai | ..................... | B62D 55/30 305/145 |
| 5,984,436 A * | 11/1999 | Hall | ...................... | B62D 55/30 305/143 |
| 6,024,183 A * | 2/2000 | Dietz | ..................... | B62D 55/30 180/9.1 |
| 6,106,082 A * | 8/2000 | Gustin | .................. | B62D 55/30 305/145 |
| 6,224,172 B1 * | 5/2001 | Goodwin | ............. | B62D 55/112 305/143 |
| 6,249,994 B1 * | 6/2001 | Oertley | .................. | B62D 55/30 180/9.1 |
| 6,276,768 B1 * | 8/2001 | Miller | ...................... | E02F 9/02 305/144 |

(Continued)

*Primary Examiner* — Hau Phan
*Assistant Examiner* — Jacob Meyer
(74) *Attorney, Agent, or Firm* — Inskeep IP Group, Inc.

(57) ABSTRACT

The track tension of a tracked vehicle is actively controlled by a track tensioner system that is positioned behind or within an idler wheel of a tracked vehicle. The system employs no exposed hydraulic line and is operable to default to a passive tensioning mode in the event of a system failure. The hydraulic circuit of the track tensioner system is powered by the rotation of the idler wheel inside which the system resides.

18 Claims, 15 Drawing Sheets

(56) References Cited

U.S. PATENT DOCUMENTS

| | | | | |
|---|---|---|---|---|
| 6,280,010 B1* | 8/2001 | Oertley | B62D 55/30 | 305/144 |
| 6,289,259 B1* | 9/2001 | Choi | B23K 3/0623 | 425/145 |
| 6,305,762 B1* | 10/2001 | Oertley | B62D 55/06 | 305/143 |
| 6,305,763 B1* | 10/2001 | Oertley | B62D 55/30 | 305/144 |
| 6,336,690 B2* | 1/2002 | Toms | B62D 55/30 | 305/144 |
| 6,354,678 B1* | 3/2002 | Oertley | B62D 55/30 | 305/143 |
| 6,641,235 B2* | 11/2003 | Boyum | B62D 55/305 | 305/143 |
| 6,682,155 B2* | 1/2004 | Hoff | B62D 55/30 | 305/145 |
| 6,868,305 B2* | 3/2005 | Choi | B23K 3/0623 | 425/135 |
| 6,948,783 B2* | 9/2005 | Hoff | E02F 9/02 | 305/144 |
| 7,172,257 B2* | 2/2007 | Tamaru | B62D 55/30 | 305/125 |
| 7,296,862 B2* | 11/2007 | Albright | B62D 55/12 | 305/143 |
| 7,628,093 B2* | 12/2009 | Madhani | B25J 9/104 | 74/490.03 |
| 7,770,984 B2* | 8/2010 | Schmit | B62D 55/30 | 305/145 |
| 7,866,420 B1* | 1/2011 | Claas | B62D 55/305 | 180/9.1 |
| 7,914,087 B2* | 3/2011 | Alfthan | B62D 55/305 | 305/125 |
| 8,336,420 B2* | 12/2012 | Carter | B25J 17/0275 | 74/490.01 |
| 8,588,030 B2* | 11/2013 | Coste | G01V 1/155 | 367/190 |
| 8,870,303 B2* | 10/2014 | Moser | B62D 33/06 | 305/143 |
| 2001/0038245 A1* | 11/2001 | Toms | B62D 55/30 | 305/145 |
| 2002/0013642 A1* | 1/2002 | Choi | B23K 3/0623 | 700/275 |
| 2003/0117017 A1* | 6/2003 | Hoff | B62D 55/30 | 305/143 |
| 2003/0122422 A1* | 7/2003 | Hoff | B62D 55/30 | 305/145 |
| 2005/0103539 A1* | 5/2005 | Mukaino | B62D 55/305 | 180/9.1 |
| 2008/0216596 A1* | 9/2008 | Madhani | B25J 9/104 | 74/490.05 |
| 2008/0224535 A1* | 9/2008 | Schmit | B62D 55/30 | 305/145 |
| 2011/0273966 A1* | 11/2011 | Coste | G01V 1/155 | 367/189 |
| 2011/0296944 A1* | 12/2011 | Carter | B25J 17/0275 | 74/490.05 |
| 2014/0144716 A1* | 5/2014 | Wirkus | B62D 55/305 | 180/9.1 |
| 2014/0174839 A1* | 6/2014 | Steben | B62D 33/06 | 180/9.23 |
| 2015/0008052 A1* | 1/2015 | Steben | B62D 33/06 | 180/9.23 |
| 2015/0089934 A1* | 4/2015 | Richards | F15B 1/027 | 60/393 |

* cited by examiner

TRACK TENSIONER

GOVERNMENTAL INTEREST STATEMENT

This invention was made with Government support under Department of Defense—Army: TACOM Contract W56 HZV-09-C-0041 SBIR Phase 2 "Advanced Electromechanical Track Tensioner." The Government has certain rights in this invention.

FIELD OF THE INVENTION

The present invention relates to active or dynamic systems for track tensioning on a tracked vehicle and methods related thereto. More particularly, the present invention relates to hydraulically actuated active track tensioners and related methods for adjusting a track tension.

BACKGROUND OF THE INVENTION

Tracked vehicles such as military vehicles have been in use for nearly a century. Track tension of such vehicles must be maintained at the proper level throughout operation over various terrain profiles in order to keep the track from sliding off the sprocket during a sudden maneuver or turn, as well as to prevent excessive load from being applied to the tracks, the vehicle drive train, and the vehicle suspension. Additionally, track tension has a large impact on power efficiency as an over tightened or tensioned track can lead to power loss from excess friction and accelerated wear of the track system.

Track tension is typically controlled by moving a sprocket or idler wheel that engages the track. A conventional passive mechanism for moving the sprocket or idler wheel is a track tensioner employing a grease-filled cylinder. A piston in the cylinder moves as grease is added or removed through a fitting. The piston's motion functions, in turn, to move the sprocket or idler wheel relative to the track thereby causing the sprocket or idler wheel to either extend into the track path and increase the tension of the track or to withdraw from the path of the track and decrease the tension of the track.

Often, a maintenance crew will adjust such a passive track tension on a vehicle to the highest level the system might need until the next maintenance opportunity after a mission or project, regardless of whether the resulting track tension is appropriate for optimal fuel economy, vehicle mobility or track component service life. The crew will simply tighten the track until it does not fall off during dynamic vehicle use.

Track tensioning systems have also been developed which have the ability to adjust track tension during vehicle operation and in certain designs, in response to changing terrain. However, these prior art systems are expensive and require extensive vehicle modification in order to be retroactively fitted to a vehicle. Furthermore, these known track tensioners increase the vulnerability of the vehicle to breakdown due to the addition of exposed hydraulic lines outside of the vehicle armor protection. Hence these track tensioners tend to also increase vehicle maintenance requirements. These problems have resulted in the relatively limited use of such systems on current tracked vehicles.

What is needed in the art is a dynamic or active track tensioner that is easily and economically installed on new and existing vehicles and that does not result in increased vehicle vulnerability and maintenance.

OBJECTS AND SUMMARY OF THE INVENTION

The present invention provides a dynamic or active track tensioner that is easily and economically installed on new and existing vehicles and that does not result in increased vehicle vulnerability and maintenance. These objectives are achieved, in part, by certain embodiments of the present track tensioner comprising an actuator; a valve; a fluid pump in fluid communication with the actuator; a fluid tank in fluid communication with the actuator; and an accumulator in fluid communication with the actuator. The fluid pump, the fluid tank, and the accumulator being positioned within or behind an idler wheel.

These objectives are also achieved, in part, by certain embodiments of the present track tensioner comprising an actuator; a fluid pump in fluid communication with the actuator through a pump flow path; a fluid tank in fluid communication with the actuator through a tank return flow path; an accumulator in fluid communication with the actuator through an accumulator flow path; and a manifold through which at least the actuator flow path, the tank return flow path, and the accumulator flow path are formed.

These objectives are also achieved, in part, by certain embodiments of the present track tensioner by a method including the steps of determining a desired tension of the track on the track vehicle; generating a fluid pressure through the rotation of an idler wheel on said tracked vehicle; increasing the tension of the track of the tracked vehicle by extension of the idler wheel with said fluid pressure; and decreasing a tension of the track of the tracked vehicle by retraction of the idler wheel through a release of said fluid pressure

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
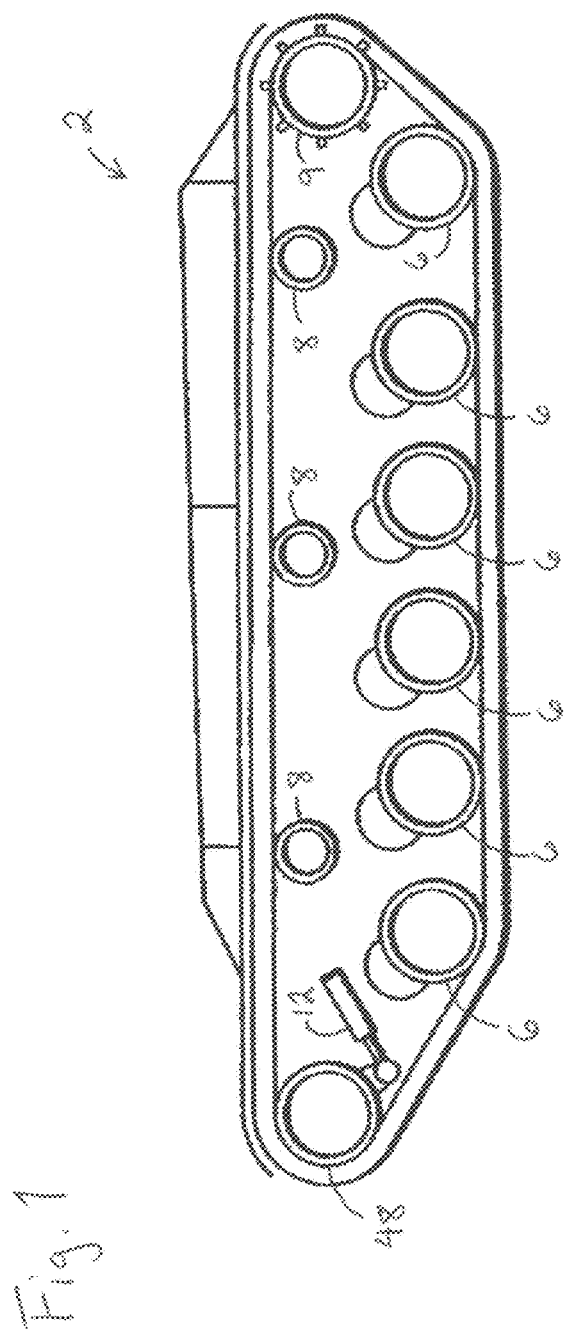
FIG. 1 is a side elevation view of a tracked vehicle.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

FIG. 1 shows an example of a tracked vehicle 2 having a track 4 that extends around a plurality of road wheels 6; a plurality of upper idler wheels 8; a drive sprocket 9; and a transposable idler wheel 48. An actuator 12 is attached to the transposable idler wheel 48 and the tracked vehicle 2 and is operable to change a position of the idler wheel 48 relative to the track vehicle 2, thereby adjusting a tension of the track 4.

Broadly speaking, the track tensioner of the present invention is a self contained active track tensioning system that is configured, in part, to replace an existing passive track tensioning system of a vehicle with minimal vehicle modifications required and minimal associated costs. The components of the present track tensioner, with the exception of at least a portion of the actuator 12, are all contained within the idler wheel 48 of the tracked vehicle 2, as shown in FIG. 1. The present track tensioner employs no exposed hydraulic lines, thereby resulting in a robust, damage tolerant system which is easily adapted to a wide range of tracked vehicles.

An external control system actively or automatically controls the position of the idler wheel 48 and thus a tension of the track 4. For example, the control system may control the position of the idler wheel 48 by monitoring, in part, the suspension travel of the vehicle's road wheels 6 and/or the power demands of the vehicle's powertrain. Furthermore, the track tensioning system of the present invention may employ a manual controller that provides a drive command to the idler wheel 48 for manually establishing, for example, a high and/or a low tension or the track 4.

Power for operation of the track tensioner of the present invention is obtained from the rotation of the idler wheel 48 within which the present track tensioner is housed and protected. Power for the track tensioner of the present invention is extracted from the moving track of the tracked vehicle, i.e. the track of the tracked vehicle functions as a drive belt for the track tensioner. Hence, the present track tensioner advantageously does not require that the power for the track tensioner be moved from one position in the vehicle to another by, for example, employing hydraulic lines or electrical cables. Furthermore, the inertia of the vehicle serves to smooth out the power draw required by the track tensioner.

The track tensioner of the present invention employs a system of hydraulic valves that, in event of failure of the hydraulic supply, is configured to isolate the track tensioner actuator 12, thereby converting the present track tensioner from an active tensioner mode to a passive tensioner mode. Accordingly, the present active track tensioner is advantageously configured to provide a default or backup passive tensioning mode in the event of damage or malfunction of the system.

Figure 2:
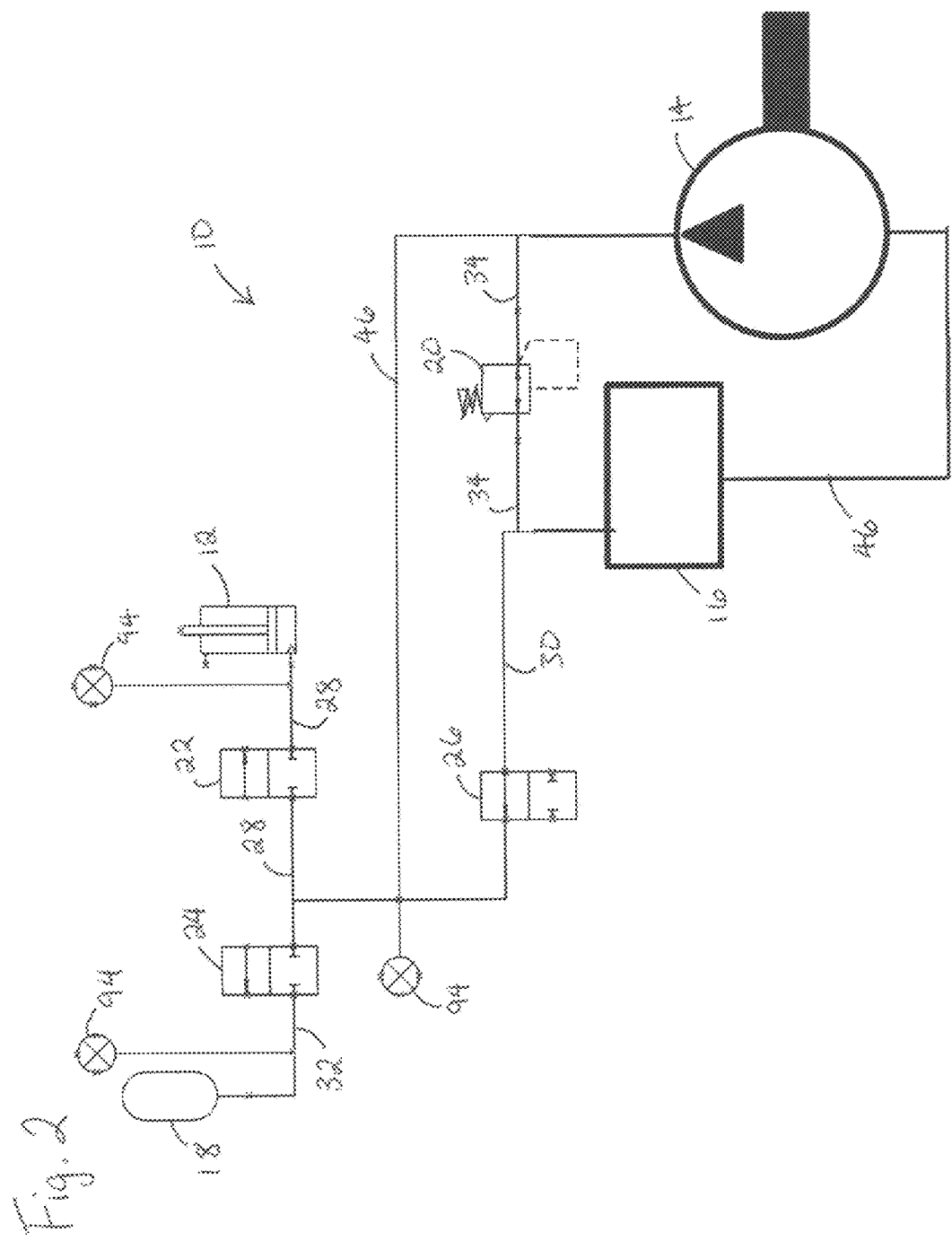
FIG. 2 is a diagram of a hydraulic circuit of a track tensioner according to one embodiment of the present invention.

A track tensioner 10 according to a first embodiment of the present invention will now be described in greater detail with reference to FIGS. 2-6. FIG. 2 is a diagram of a hydraulic circuit of an active track tensioner 10 according to one embodiment of the present invention. The active track tensioner 10 employs a hydraulic pump 14 that is in fluid communication with an actuator 12 and a fluid tank 16 via a pump flow path 46 and an actuator flow path 28. Positioned within the actuator flow path 28 is an actuator control valve 22. The hydraulic fluid tank 16 is in fluid communication with the actuator 12 via a tank return flow path 30. Positioned within tank return flow path 30 is an unload valve 26. An accumulator 18 is also in fluid communication with the actuator 12 via an accumulator flow path 32. Positioned within the accumulator flow path 32 is an accumulator valve 24. The active track tensioner 10 may further employ a pressure relief valve 20. The pressure relief valve 20 is in fluid communication with the tank return flow path 30 and the pump flow path 46 via a pressure relief flow path 34.

The track tensioner 10 may further incorporate one or more check valves that serve to maintain pressure in desired portions of the above described circuit and/or prevent back flow of fluid through the circuit. For example, the accumulator valve 24 may be configured as a check valve within the accumulator flow path 32. The track tensioner 10 may further incorporate one or more pressure sensors 94 that serve to monitor fluid pressure within various portions of the system.

Figure 3:
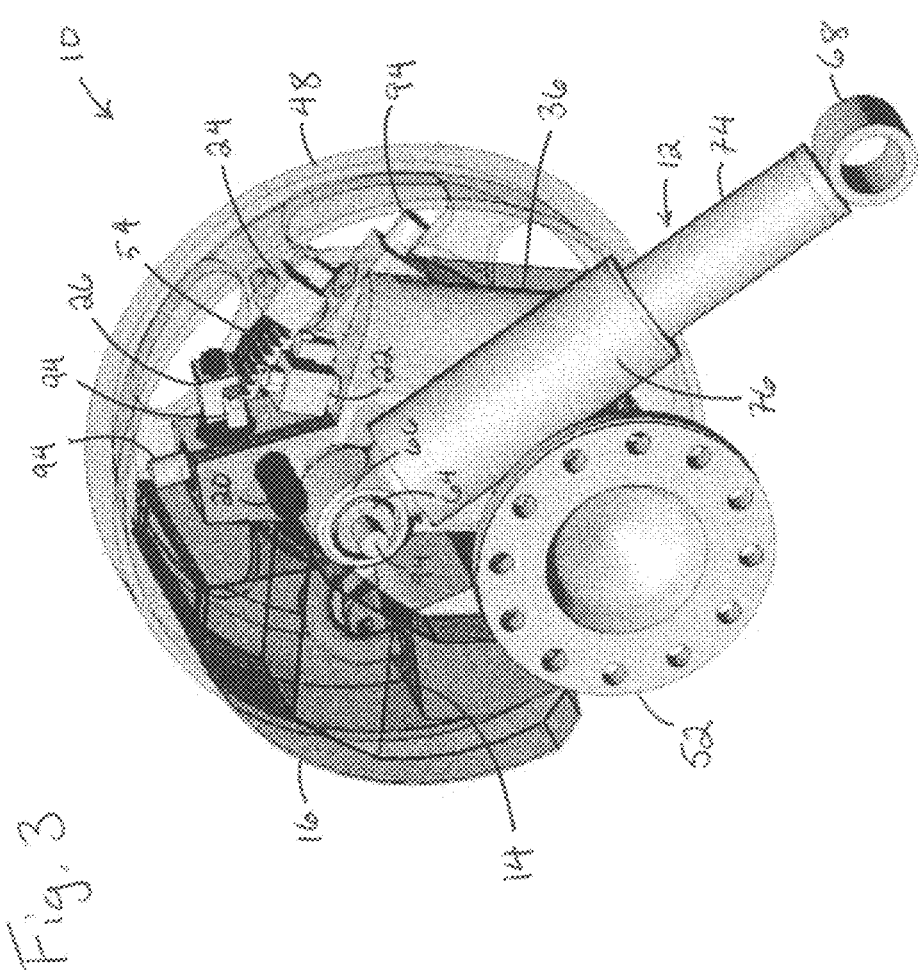
FIG. 3 is a perspective view of a track tensioner according to one embodiment of the present invention.
Figure 4:
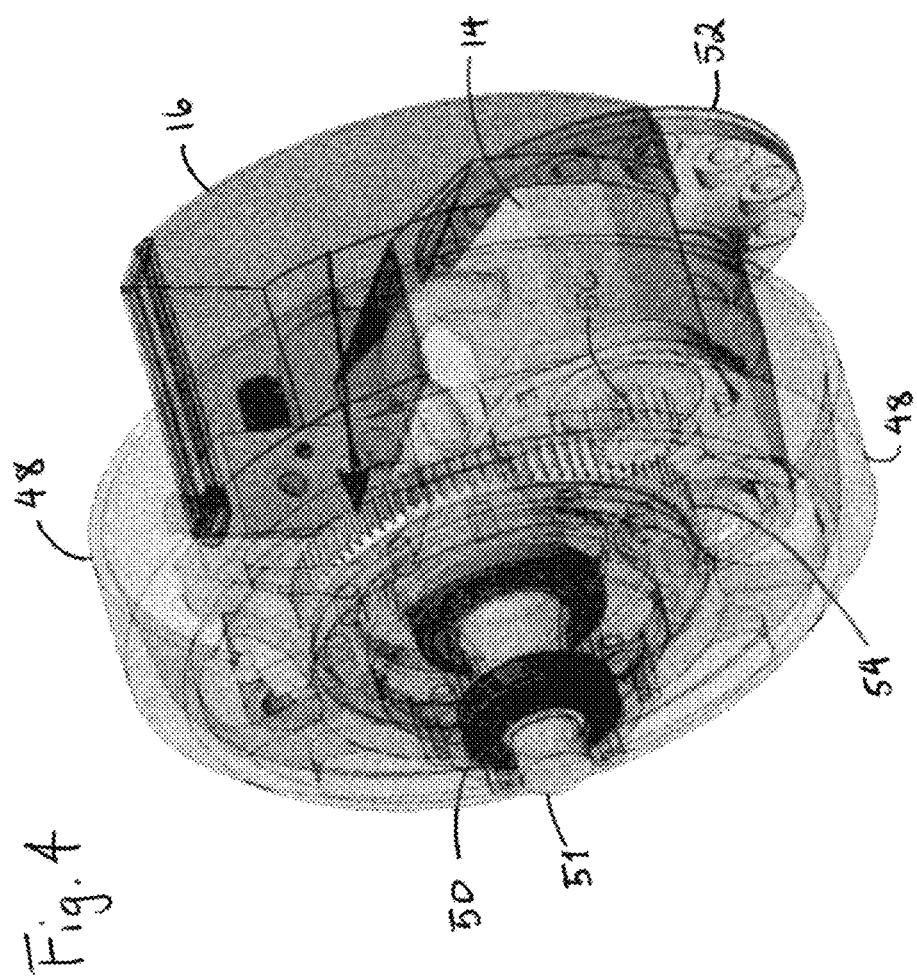
FIG. 4 is a perspective view of a track tensioner according to one embodiment of the present invention.

As shown in FIGS. 3 and 4, the above described components are assembled to one another around a manifold 36. FIG. 3 shows the track tensioner 10 assembled within the idler wheel 48 from a backside view of the idler wheel 48. FIG. 4 shows the track tensioner 10 assembled within the idler wheel 48 from a semi-transparent view through the front side of the idler wheel 48. In certain embodiments, the idler wheel 48 is an existing idler wheel from the tracked vehicle 2. Depending on the configuration of the tracked vehicle's existing idler wheel, the existing idler wheel may be employed in the active track tensioner 10 with little or no modification. As shown in the figures, all of the components of the active track tensioner 10, with the exception of at least a portion of the actuator 12, are housed within or behind the idler wheel 48.

As shown in FIG. 4, the idler wheel 48 is attached to an idler hub 50 which is rotatably attached to an idler spindle 51 about which the idler wheel 48 and idler hub 50 both rotate. In certain embodiments, the idler hub 50 is an existing idler hub employed by the tracked vehicle 2. Attached to the idler wheel 48 and/or the idler hub 50 is a drive gear 54 that rotates with the idler wheel 48 about the idler spindle 51. Drive gear 54 is attached to the idler wheel 48 so as to rotate about the idler hub 50 with the idler wheel 48.

The track tensioner manifold 36 is mated to the idler spindle 51 in a fixed, non-rotational manner such that the manifold 36 does not rotate about the idler spindle 51 with the idler wheel 48. Alternatively, the idler spindle 51 may be integrated into or formed as part of the manifold 36.

Attached to the manifold 36 at a pump interface is the hydraulic pump 14 having a pump drive gear 56, shown in FIG. 4. When the track tensioner 10 is assembled, e.g. the hydraulic pump 14 is mounted to the manifold 36 and the manifold 36 is mated to the idler wheel 48 and drive gear 54, the pump drive gear 56 interfaces with the drive gear 54 of the idler wheel 48. As the idler wheel 48 and drive gear 54 rotate about the idler spindle 51 during movement of the tracked vehicle 2, the drive gear 54 causes the pump drive gear 56 to rotate, thereby providing a drive or activation power to the hydraulic pump 14.

The manifold 36 and thus the idler wheel 48 are attached to the tracked vehicle 2 at a first point via a spindle 52. One side of the spindle 52 is pivotally or rotatably attached to the manifold 36 at a spindle mount 62, shown in FIG. 5, and an opposite side of the spindle 52 is non-pivotally attached to the track vehicle 2. As shown in FIGS. 3 and 4, the spindle mount 62 is off-set from the idler hub 50 and thus offset from an axis of rotation of the idler wheel's 48 about the idler hub 50.

The manifold 36 and thus the idler wheel 48 are attached to the tracked vehicle 2 at a second point via the actuator 12. A first end 66 of the actuator 12 is attached to an actuator tensioner mount 64 and a second end 68 of the actuator 12 is attached to an actuator hull mount 102, shown in FIG. 9, of the tracked vehicle 2, shown in FIG. 1. In certain embodiments, the actuator hull mount 102 on the tracked vehicle 2 is an existing and/or conventional actuator mount employed in cooperation with a passive track tensioner system.

Figure 5:
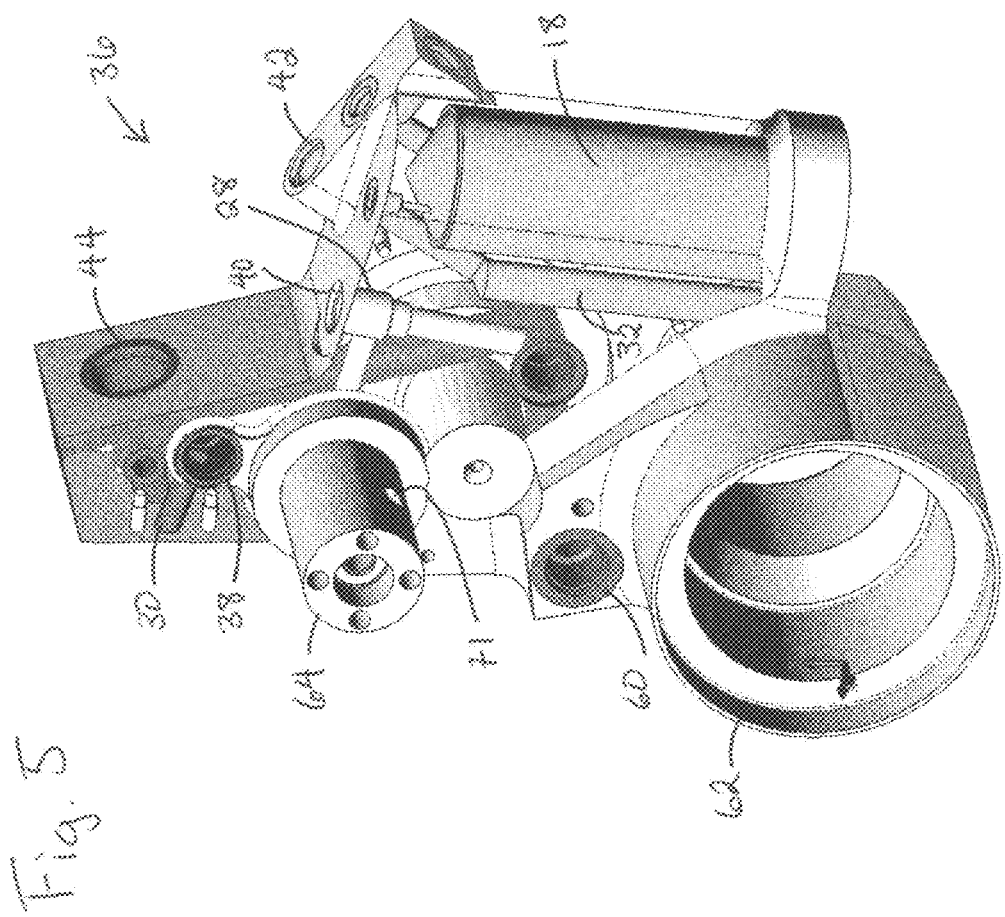
FIG. 5 is a perspective view of a manifold of a track tensioner according to one embodiment of the present invention.
Figure 6:
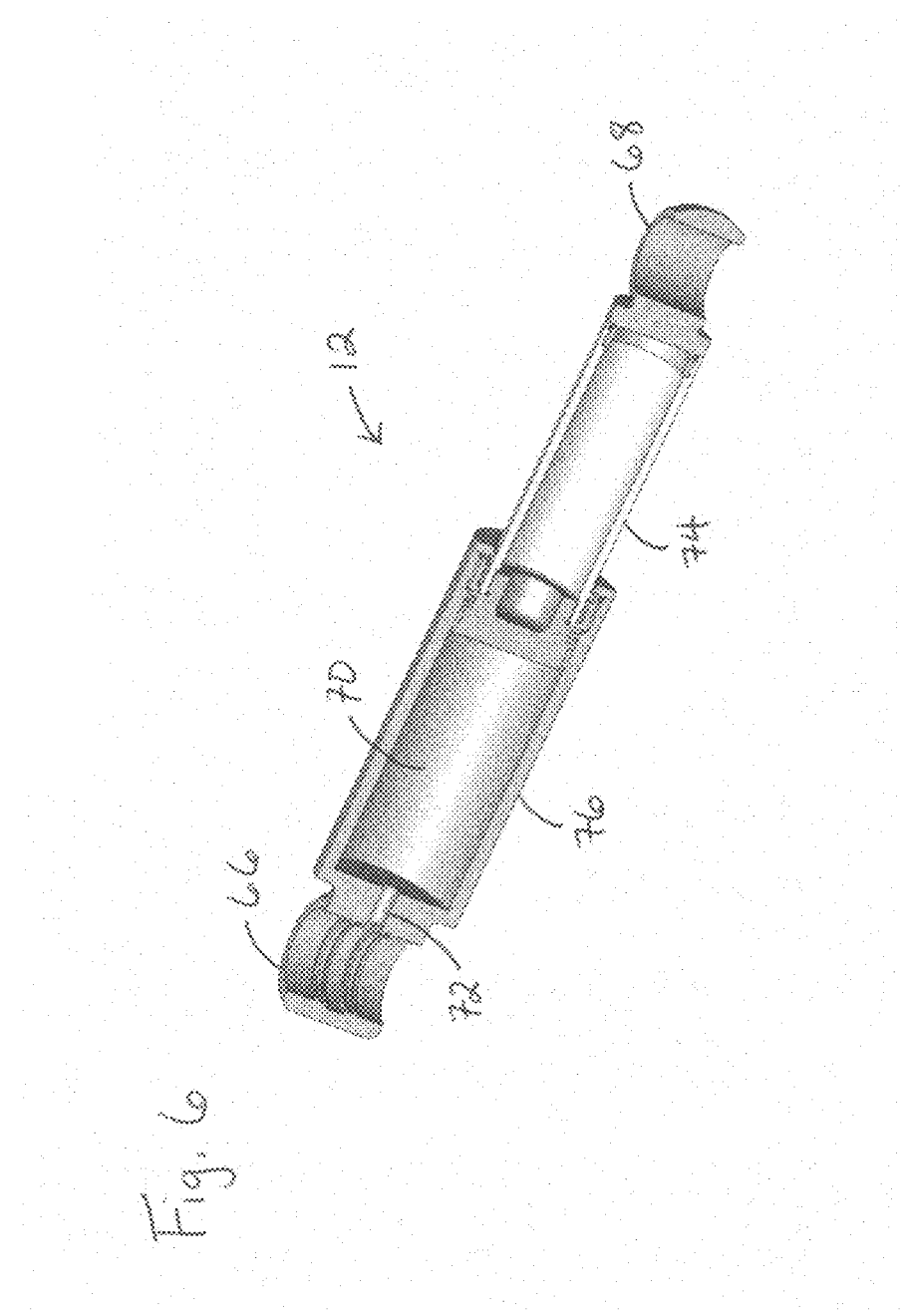
FIG. 6 is a perspective, cross-sectional view of an actuator of a track tensioner according to one embodiment of the present invention.

As shown in FIG. 6, the actuator 12 is a telescoping hydraulic actuator that employs an outer cylinder 76 having a chamber 70 and an inner cylinder 74 slideable within the outer cylinder 76. In operation, hydraulic fluid is added or removed from the chamber 70 of the actuator 12 through outlet 71 of the actuator tensioner mount 64 and inlet 72. As shown in FIGS. 5 and 6, the first end 66 of the actuator 12 forms a banjo-like fitting over the actuator tensioner mount 64, thereby allowing for the flow of fluid from the actuator fluid flow path 28 formed within the manifold 36 out the outlet 71 and into the inlet 72 of the actuator 12. As fluid is added to the chamber 70, the volume of the chamber 70 increases and the inner cylinder 74 is pushed out from the outer cylinder 76, thereby increasing the overall length of the actuator 12. As fluid is removed from the chamber 70, the volume of the chamber 70 decreases and the inner cylinder 74 retracts into the outer cylinder 76, thereby shortening an overall length of the actuator 12. Due to the spindle mount 62 being off-set form the idler hub 50, when the length of the actuator 12 is changed, the position of the idler wheel 48 changes relative to the tracked vehicle 2, thereby allowing for the addition or release of tension of the track passing over the idler wheel 48.

Central to the operation and configuration of the active track tensioner 10 is the manifold 36. As described above, the track tensioner 10 employs no exposed hydraulic lines that are easily susceptible to damage. As shown in FIG. 5, this is achieved by incorporating or integrating at least the accumulator 18; the actuator flow path 28; the accumulator flow path 32; the tank return flow path 30; and the pressure relief flow path 34 into the manifold 36. In one embodiment, the manifold 36 is machined from a single block of metal or other similarly resilient material thereby forming a unitary component. In certain embodiments, the manifold 36 is formed of a plurality of blocks of metal or other similarly resilient material and thereafter attached to one another.

As shown in FIG. 6, various interfaces are formed upon external surfaces of the manifold 36 in order to facilitate attachment of the various components of the track tensioner 10 to the manifold 36. The interfaces may, for example, have the form of cylindrical threaded receiving portions machined into the manifold 36 that are complimentary to male couplings and/or to cylindrical threaded protrusions formed on the components intended for attachment to the manifold 36.

For example, a pressure relief valve interface 38 serves for attachment of the pressure relief valve 20 to the pressure relief flow path 34 formed within the manifold 36. An actuator valve interface 40 serves for attachment of the actuator valve 22 to the actuator flow path 28 formed within the manifold 36. An accumulator valve interface 42 serves for attachment of the accumulator valve 24 to the accumulator flow path 32 formed within the manifold 36. An unload valve interface 44 serves for attachment of the unload valve 26 to the tank return flow path 30 formed within the manifold 36. A pump flow path interface 60 serves for establishing fluid flow from the hydraulic pump 14 into the manifold 36. In certain embodiments, the pump flow path 46 employs a combination of fluid flow paths formed within the manifold 36 and flow paths external of the manifold 36 in order to place the hydraulic pump 14 in fluid communication with the tank 16 and the actuator 12.

In certain embodiments, the track tensioner 10 of the present invention employs, for example, solenoid-controlled poppet-type valves, proportional-type valves, and/or servo valves for the actuator control valve 22, the accumulator valve 24, and/or the unload valve 26. FIG. 2 is a hydraulic circuit diagram of the track tensioner 10 in which solenoid-controlled poppet-type valves are employed for the actuator control valve 22, accumulator valve 24, and the unload valve 26. For example, the actuator control valve 22 and the accumulator valve 24 may be Parker GS04 08 N.C. poppet valves, and the unload valve 26 may be a Parker GS06 18 N.O. poppet valve.

In certain embodiments, the track tensioner 10 is configured to employ the pump 14 intermittently in order to refill or recharge the accumulator 18. Once the accumulator 18 is filled, the unload valve 26 opens and the fluid flow from the pump 14 is returned to the tank 16.

Figure 7:
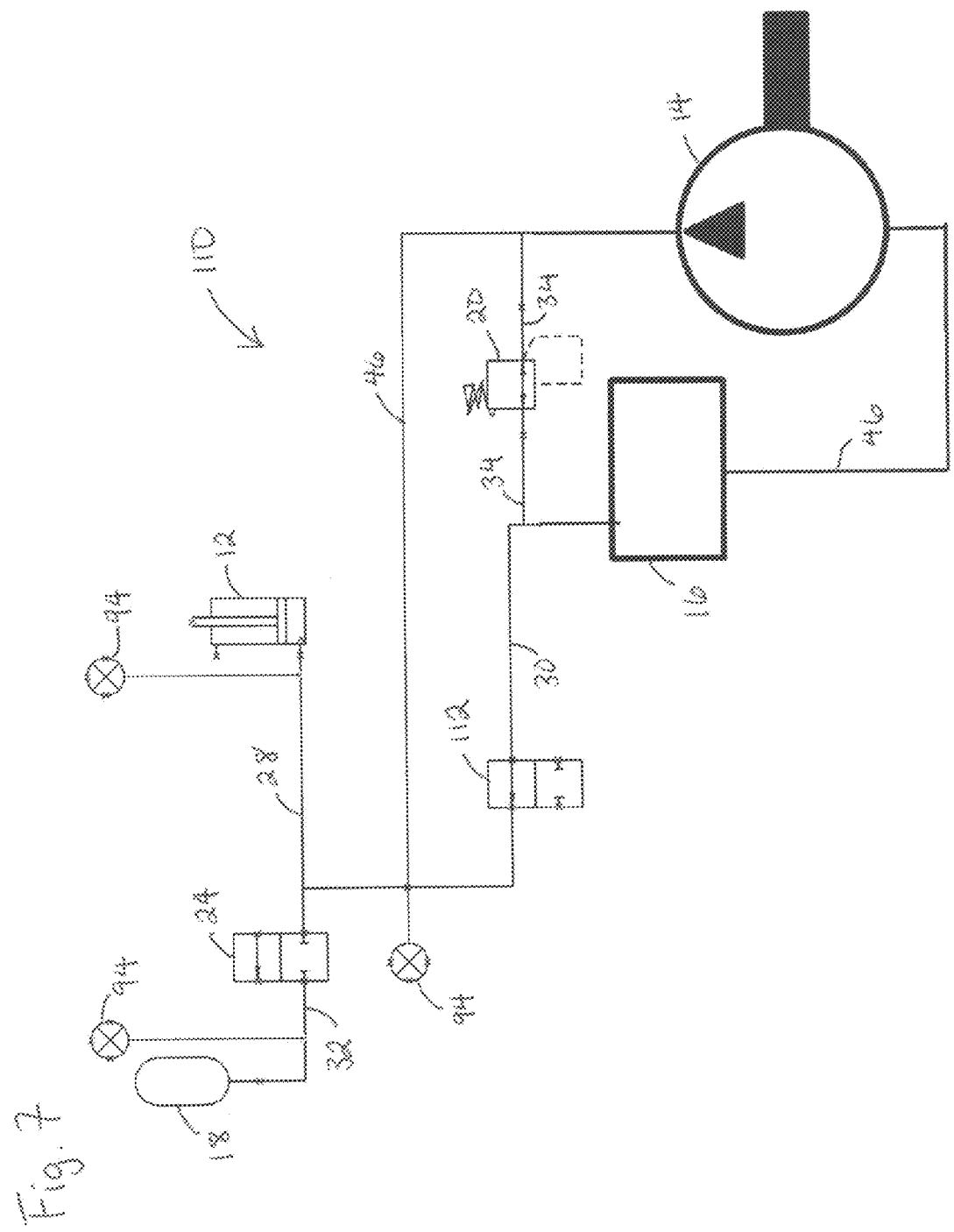
FIG. 7 is a diagram of a hydraulic circuit of a track tensioner according to one embodiment of the present invention.

FIG. 7 is a hydraulic circuit diagram of a track tensioner 110 according to a second embodiment of the present invention. The track tensioner 110 is substantially identical to the track tensioner 10 described above except for the following differences. With respect to the components shown in FIG. 7 that are not described below, the descriptions of the same numbered components provided above with respect to the track tensioner 10 are applicable to the track tensioner 110. As shown in FIG. 7, in place of the separate actuator control valve 22 and the unload valve 26 described with respect to the track tensioner 10, the track tensioner 110 employs a single proportional control valve 112 within the tank return flow path 30. For example, the proportional control valve 112 may be a Parker DF161C40 D024W proportional valve. The track tensioner 110 provides the advantage of a relatively greater control authority to accurately position the actuator 12 during retraction than that achieved by the track tensioner 10.

Figure 8:
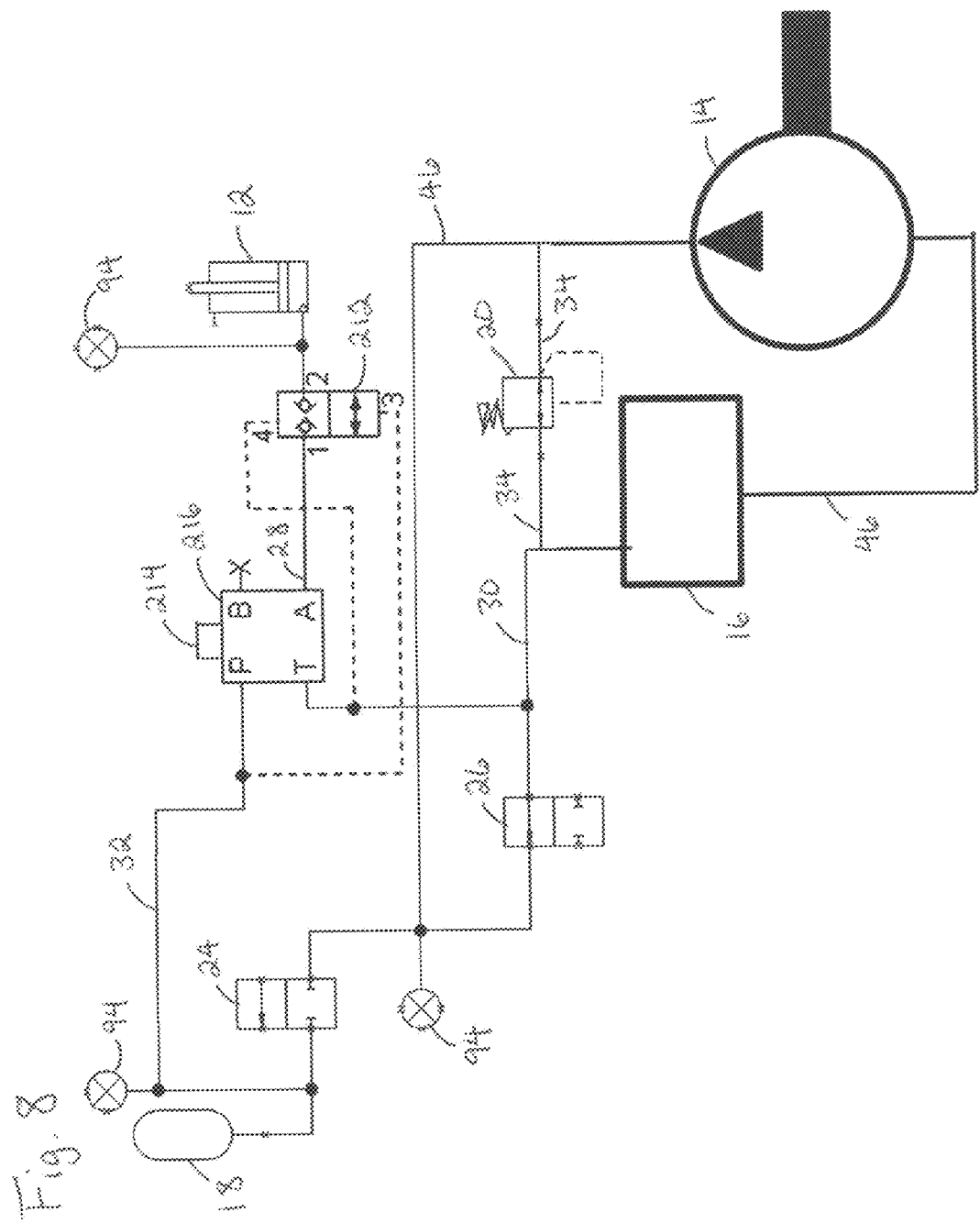
FIG. 8 is a diagram of a hydraulic circuit of a track tensioner according to one embodiment of the present invention.

FIGS. 8-14 show a track tensioner 210 according to yet a third embodiment of the present invention. More particularly, FIG. 8 is a hydraulic circuit diagram of a track tensioner 210. The track tensioner 210 is substantially identical to the track tensioner 10 described above except for the following differences. With respect to the components shown in FIGS. 8-14 that are not described below, the descriptions of the same numbered components provided above with respect to the track tensioner 10 are applicable to the track tensioner 210.

As shown in FIG. 8, in place of the actuator control valve 22 described with respect to the track tensioner 10, the track tensioner 210 employs an isolation valve 212 and a servo control valve 214. For example, the isolation valve 212 may be a Sun DKDS-XHN (15 gmp), and the servo control valve 214 may be a Moog D633 valve. In certain embodiments of the track tensioner 210, the accumulator valve 24 may be used as a check valve. In order to employ the servo control valve 214 with the manifold 36, a valve block 216, shown in FIG. 11, is employed. The manifold 36 may be modified to include bolt holes 218 or other forms of structure for attachment of the valve block 216 to the manifold 36. The valve block 216 is mounted to a surface 220 of the manifold 36, shown in FIG. 10.

The valve block 216 serves to advance at least the actuator flow path 28, the pressure relief path 34, and the accumulator flow path 32 from the manifold 36 to the servo control valve 214. The extension or advancement of the these flow paths is achieved by formation of the flow paths through the valve block 216 in the same or similar manner in which the flow paths are formed through the manifold 36. Hence, the track tensioner 210 also employs no exposed hydraulic lines; thereby resulting in a robust, damage tolerant system.

In certain embodiments, the track tensioner 210 is configured to employ the pump 14 intermittently in order to refill or recharge the accumulator 18. Once the accumulator 18 is filled, the unload valve 26 opens and the fluid flow from the pump 14 is returned to the tank 16.

Figure 9:
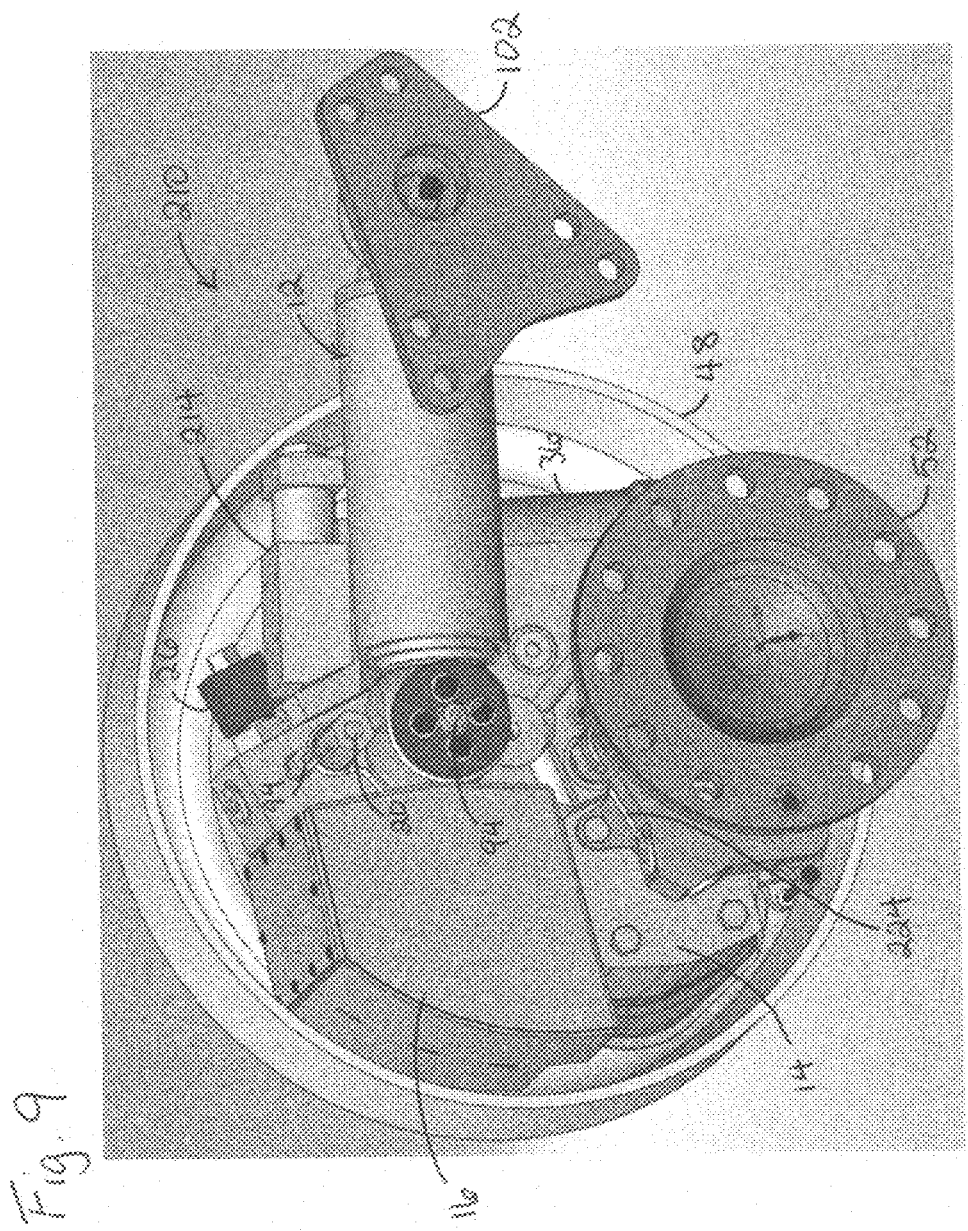
FIG. 9 is a perspective view of a track tensioner according to one embodiment of the present invention.
Figure 10:
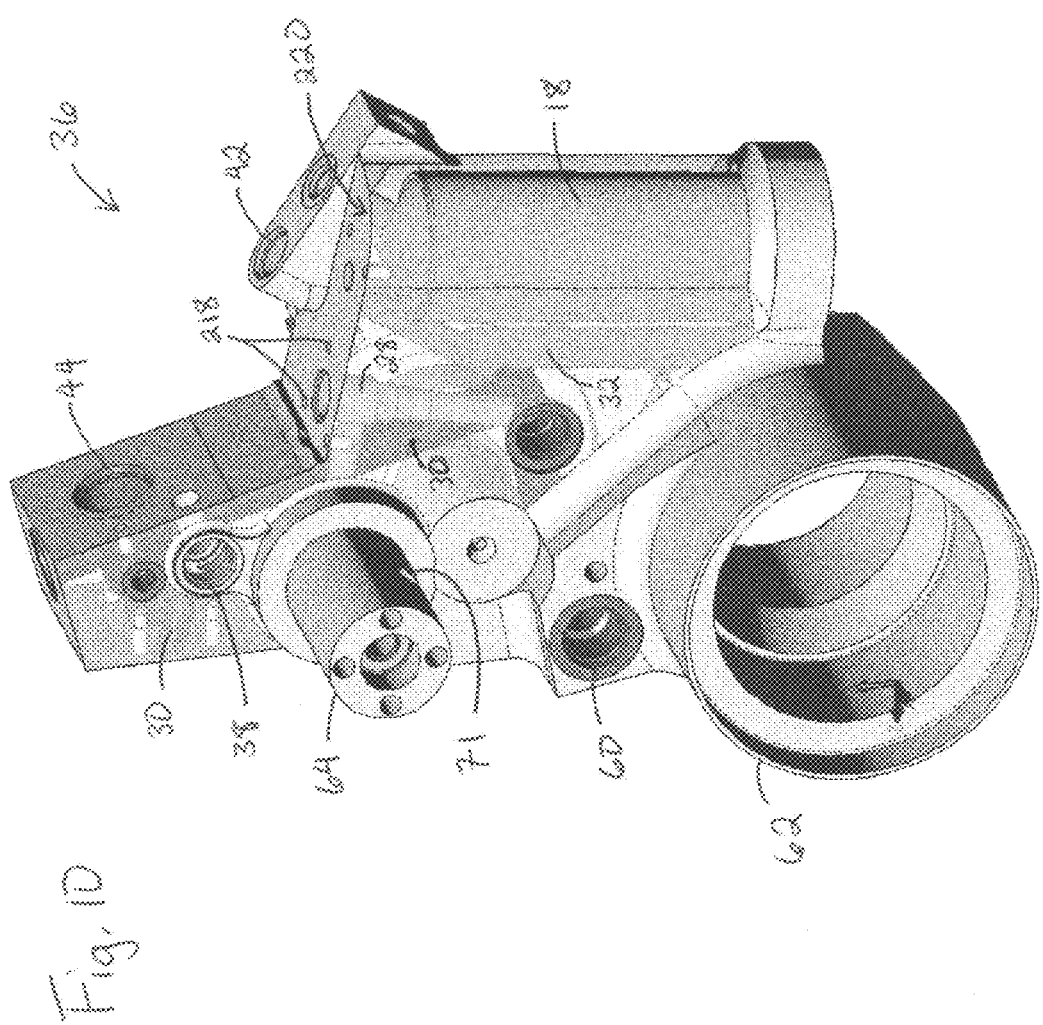
FIG. 10 is a perspective view of a manifold of a track tensioner according to one embodiment of the present invention.
Figure 11:
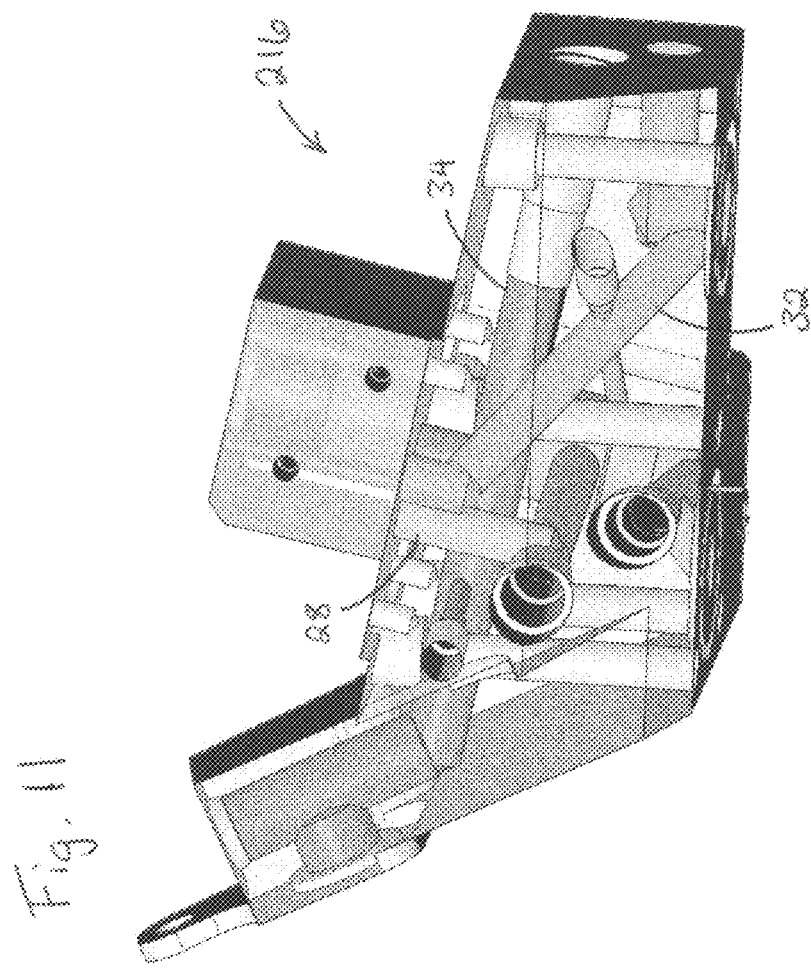
FIG. 11 is a perspective view of a valve block of a track tensioner according to one embodiment of the present invention.
Figure 12:
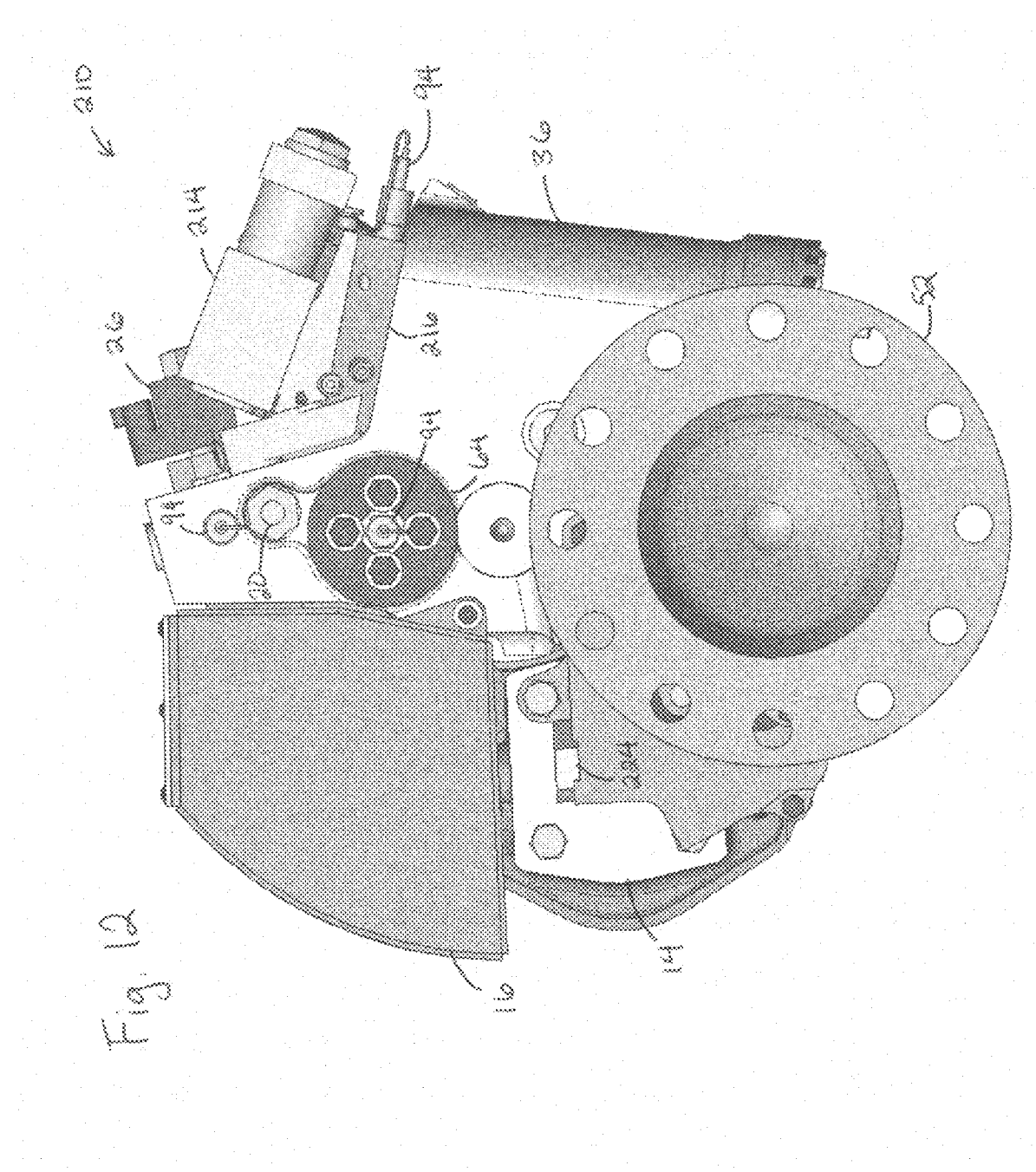
FIG. 12 is a side elevation view of a track tensioner according to one embodiment of the present invention.
Figure 13:
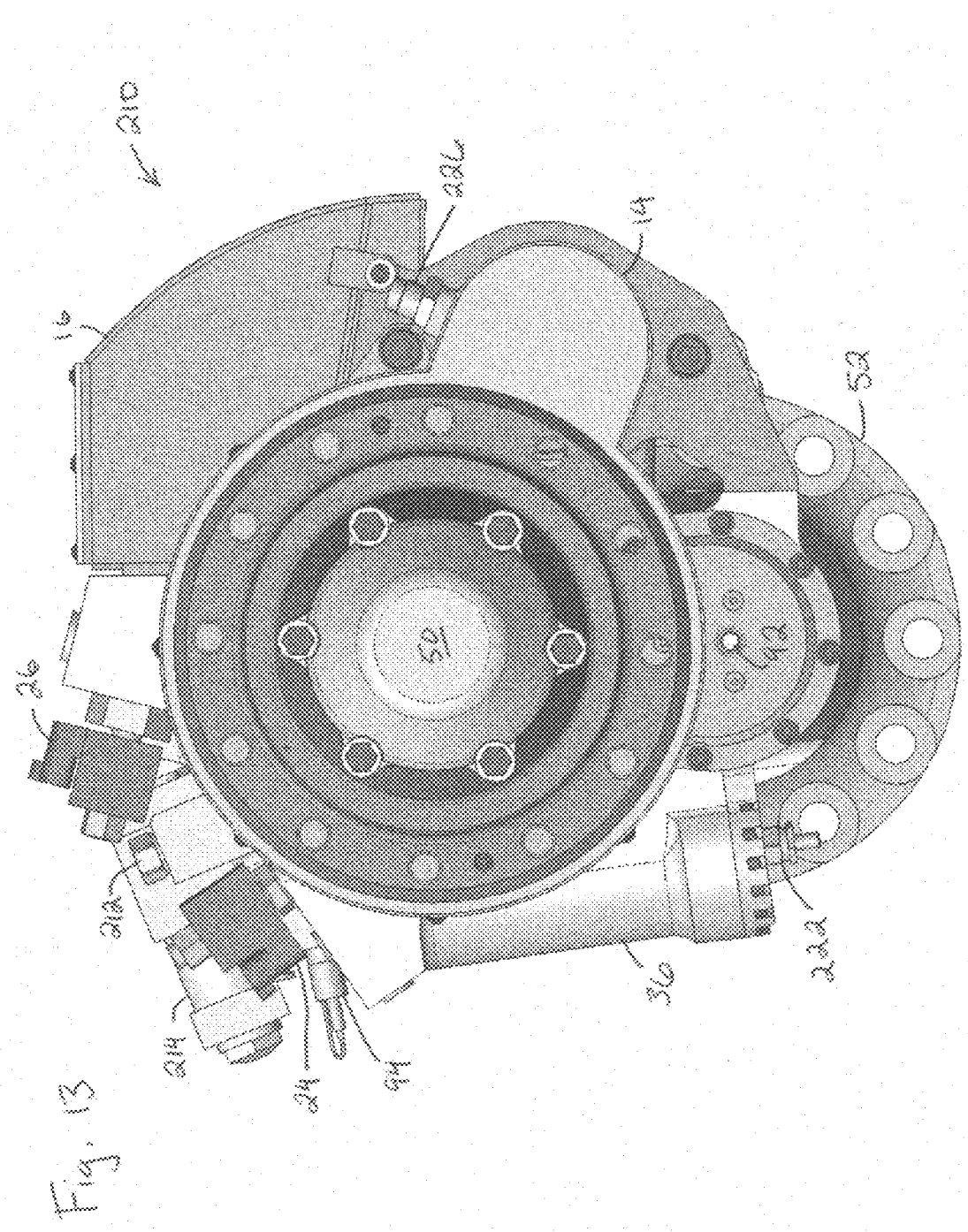
FIG. 13 is a side elevation view of a track tensioner according to one embodiment of the present invention.
Figure 14:
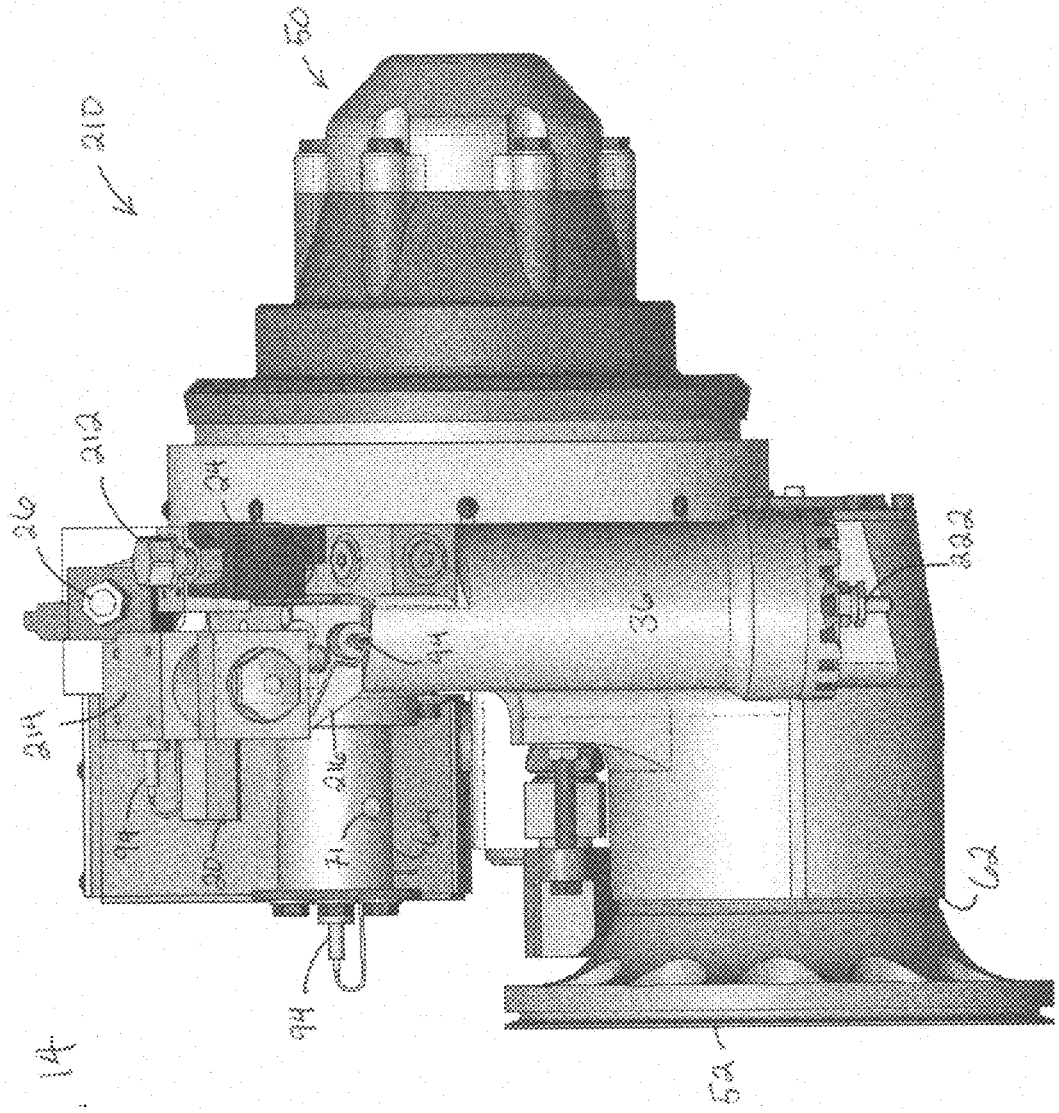
FIG. 14 is a side elevation view of a track tensioner according to one embodiment of the present invention.

With respect to FIGS. 9-14, FIG. 9 shows the track tensioner 210 assembled within the idler wheel 48 from a backside view of the idler wheel 48. FIG. 10 is a perspective view of the manifold 36 modified for attachment of the valve block 216 shown in FIG. 11. FIG. 12 is a view of the assembled track tensioner 210 from a similar perspective as shown in FIG. 9 except that the idler wheel 48 and the actuator 12 are not present. FIG. 13 is a view of the assembled track tensioner 210 from an opposite side as shown in FIG. 12 without the idler wheel 48 and the actuator 12 attached. Finally, FIG. 14 is a side view of the track tensioner 210 without the idler wheel 48 and the actuator 12 attached.

In certain embodiments of the present invention, the manifold 36 is modified so as to achieve the hydraulic circuit shown in FIG. 8, without employing the valve block 216. In other words, in order to facilitate employing the servo control valve 214 and the isolation valve 212, the valve block 216 may be deleted from the system and the flow paths formed within the manifold 36 modified to centrally converge or interface with the servo valve 212.

The track tensioner 210 provides the advantage of relatively greater control authority to accurately position the actuator 12 during retraction than that achieved by the track tensioner 10, as well as decreased time lag between the commanded actuator positions and the actuator reaching the desired position than that achieved by the track tensioner 110.

In certain embodiments of the present invention, the accumulator 18 employed of the track tensioner 10, 110, 210 is configured to have a volume large enough to store sufficient hydraulic fluid to extend the actuator 12 up to half of the total possible travel of the actuator 12, when the idler wheel 48 is not in motion. For example, the accumulator 18 is configured to store a volume of hydraulic fluid that is sufficient to transpose the actuator 12 approximately 2.85 inches of a total possible travel of approximately 5.7 inches. As shown in FIG. 14, the accumulator 18 employed in the track tensioner 10, 110, 210 may incorporate a gas exchange valve 222.

In certain embodiments of the present invention, the hydraulic pump 14 of the track tensioner 10, 110, 210 may, for example, be an off-the-shelf hydraulic pump having a maximum power consumption of approximately eighty horsepower. So long as the idler wheel 48 is turning, the hydraulic pump 14 is operable to produce enough pressure to extend the actuator 12. The hydraulic pump 14 is configured to produce a maximum pressure at a vehicle speed of approximately 7 miles per hour. The track tensioner 10, 110, 210 may further employ a hydraulic filter 224, for example an ASM filter, shown in FIG. 12, on a positive pressure or downstream side of the pump 14. The track tensioner 10, 110, 210 may further employ a pump speed sensor 226.

In certain embodiments of the track tensioner 10, 110, 210 of the present invention, an oil cooler or heat exchanger is employed in the tank return flow path 30 or other portion of the hydraulic flow path in order to improve heat dissipation in the system.

The track tensioner 10, 110, 210 produces a maximum extension force of, for example, 48,000 pounds, however, once the actuator 12 reaches a desired position and the actuator valve 24 is in a closed position, the track tensioner 10 has a maximum holding load of, for example, 82,000 pounds. The maximum actuation speed of the track tensioner 10, 110, 210 is, for example, greater than 17 inches per second.

Figure 15:
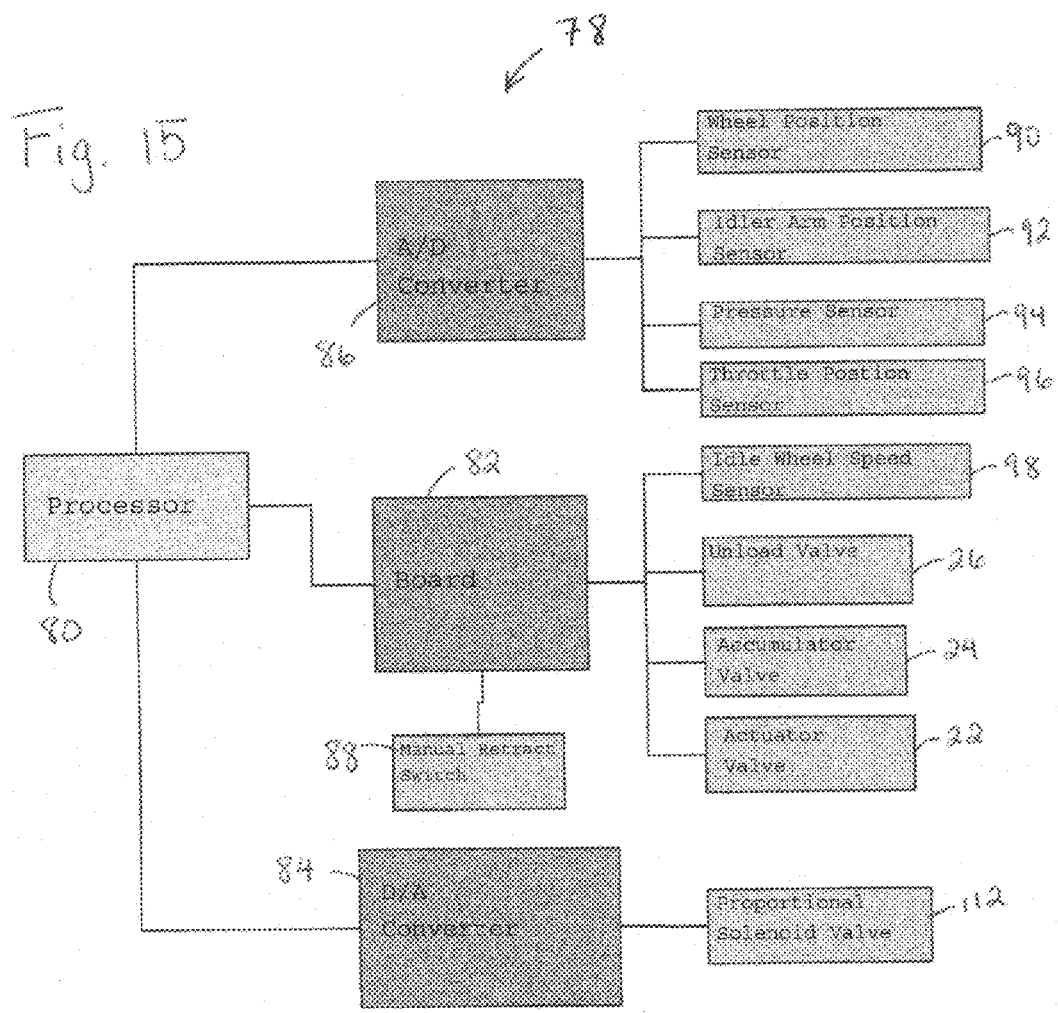
FIG. 15 is a diagram of a controller of a track tensioner according to one embodiment of the present invention.

The operation of the above-described track tensioner 10, 110, 210 according to the present invention is managed by a controller 78, shown in FIG. 15. In certain embodiments, the controller 78 employs a processor 80 in electrical communication with a digital input/output module or board 82, a digital to analog converter 84, and analog to digital converter 86. As shown in FIG. 15 the analog to digital converter 86 is in electrical communication with one or more wheel position sensors 90; idler arm position sensors 92; pressure sensors 94; and/or a throttle position sensors 96. In certain embodiments, high performance, low profile, noncontact, rotary angle position sensors are employed for use at the trailing and idler arm pivot points. Such sensors consist of a solid-state, full encased sensor assembly and an external sensor magnet, rated to IP67 environmental protection.

The digital input/output module or board 82 may, in turn, be in electrical communication with a manual retract switch 88 that functions to manually retract the actuator 12 and, thereby, release tension upon the track 4 of the tracked vehicle 2. The digital input/output module or board 82 may also be in electrical communication with an idler wheel speed sensor 98; the unload valve 26; the accumulator valve 24; and/or the actuator valve 22. Finally, the digital to analog converter 84 may be in electrical communication with the proportional solenoid valve 112 when employed in the track tensioner system, for example in the track tensioner 110 described above.

The controller 78 may, for example, employ a processor 80 in the form of an off-the-shelf UEISIM600 manufactured by United Electronic Industries. An UEISIM600 is based on a PowerPC processor and runs on a standard Linux kernel. The UEISIM600 has 6 slots, one of which is filled with an analog to digital converter 86 in the form of a DNA-AI-202 analog to digital input board having 12 analog input channels with 16 bit resolution. Another of the slots of the UEISIM600 is filled with a digital to analog converter 84 in the form of an UEI DNA-AO-308-420 board having 8 channels of analog current output with 16 bit resolution. A digital input/output module or board in the form of an UEI DNA-DIO-406 having 12 digital input channels and 12 digital output channels is also attached to the UEISIM600. The above-described track tensioner 10, 110, 210 requires only small amounts of electrical power in the order of, for example, 250 watts at 24 to 30 volts DC.

Control of the active track tensioner 10, 110, 210 of the present invention is based upon four base components or modules each having a differing level of priority. These components, listed from highest to lowest priority, are: 1) a Constant Track Length module, 2) a Tension Level Feedforward module, 3) a Tension Control Feedback module, and 4) a Passive Tension Overload Protection module.

The first module, the Constant Track Length module, employs data from the wheel position sensors 92 on each of the road wheel trailing arms and the idler arm position sensors 94 of the tracked vehicle 2 to determine the road wheel 6 and idler wheel 48 positions. Based upon these determined positions, the Constant Track Length module calculates the desired length of the actuator 12 required to keep the track path length constant based upon the perturbations of the road wheels 6 and idler wheel 48 away from their nominal ride height positions.

The second module, the Tension Level Feedforward module, calculates the tractive effort forces from the powertrain of the tracked vehicle 2 and determines the desired pressure within the actuator 12 and, hence, the force developed by the actuator 12. Without this correction the changes in track tension created by the vehicle drivetrain would cause large fluctuations in the idler wheel 48 position.

For example, if the Tension Control Feedback module controls the track tension to 10,000 pounds and a 25,000 pound tractive effort was applied to the track by the drivetrain, then absent Feedback correction the track tensioner would move the idler wheel 48 to reduce the track tension until the limit position would be reached. With Tension Level Feedforward, the desired track tension command would be increased to 35,000 pounds, allowing the 10,000 pound nominal track tension to be maintained at its appropriate set point. In certain embodiments, the torque of the sprocket 9 is previously determined and accessible through a look-up table with acceleration pedal position, transmission ratio, and idler wheel speed as inputs.

The third module, the Tension Control Feedback module, adjusts the position of the idler wheel 48 to compensate for errors in the Constant Track Length module. Such errors arise because the surface profile upon which the tracked vehicle 2 travels is approximated by the road wheel 6 positions and from deviations in the actual track length caused by track component wear and thermal growth. The Tension Control Feedback module measures track tensioning forces applied to the idler wheel 48 with the pressure sensor 94, which monitors the chamber 70 pressure of the actuator 12. Based on this pressure and the desired position of the idler wheel 48, fluid is either pumped into or released out of the actuator 12. Depending on the driving conditions, the Tension Control Feedback module also serves to control the nominal track tension, from low tension for reduced power requirements on smooth hard ground to higher tension for improved mobility over soft terrains and better load sharing between unsupported and supported track sections.

This approach is similar to a central tire inflation system, CTIS, on wheeled vehicles, which allows the tire pressure to be adjusted depending on terrain conditions. Low tire pressures improve mobility with lower tire contact pressures and increased contact patch length, at the cost of increased wear, heat build-up and power consumption due to increased rolling resistance. Higher tire pressures reduce rolling resistance and heat build-up, but have reduced soft soil mobility.

The fourth module, the Passive Tension Overload Protection module is modeled or established as a pressure relief valve 20 on the track tensioner hydraulic circuit. If the pressure within the circuit is too high the pressure relief valve 20 opens, thereby dumping fluid into the hydraulic tank 16 and reducing the tensioner force applied through the actuator. This module only operates when the track tension reaches predetermined levels which will damage the track or other parts of the track system such as the actuator 12. Such high levels of track tension could be caused by debris accumulating between the road wheels 6, the idler wheel 48, the sprocket 9, and/or the track 4 or by a failure of all or a portion of the controller 78.

The above-described four control modules together function to provide a robust controller 78 that achieves improved track life, high vehicle performance, reduced track maintenance, and high mobility.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A track tensioner system comprising:
   an actuator;
   a valve;
   a fluid pump in fluid communication with the actuator;
   a fluid tank in fluid communication with the actuator; and
   an accumulator in fluid communication with the actuator;
   wherein, the fluid pump, the fluid tank, and the accumulator are positioned within an idler wheel.

2. The system of claim 1 wherein a drive gear of the idler wheel is configured to rotate a gear of the fluid pump.

3. The system of claim 1 wherein the fluid communication is through fluid flow paths formed within a manifold.

4. The system of claim 1 wherein the fluid communication is through fluid flow paths formed exclusively within a manifold.

5. The system of claim 1 wherein the valve is a poppet valve.

6. The system of claim 1 further comprising a controller.

7. A track tensioner system comprising;
   an actuator;
   a fluid pump in fluid communication with the actuator through a pump flow path;
   a fluid tank in fluid communication with the actuator through a tank return flow path;
   an accumulator in fluid communication with the actuator through an accumulator flow path; and
   a manifold through which at least the actuator flow path, the tank return flow path, and the accumulator flow path are formed;
   wherein the fluid pump, the fluid tank, and the accumulator are positioned within an idler wheel.

8. The system of claim 7 wherein the actuator is connected directly to the manifold.

9. The system of claim 7 further comprising a poppet valve.

10. The system of claim 7 further comprising a controller.

11. The system of claim 7 wherein the accumulator is formed within the manifold.

12. A track tensioner system comprising:
an actuator;
a fluid pump in fluid communication with the actuator through a pump flow path;
a fluid tank in fluid communication with the actuator through a tank return flow path;
an accumulator in fluid communication with the actuator through an accumulator flow path; and
a manifold positioned within an idler wheel through which at least one of the actuator flow path, the tank return flow path, and the accumulator flow path is formed.

13. The system of claim 12 wherein a drive gear of the idler wheel is configured to rotate a gear of the fluid pump.

14. The system of claim 12 wherein the fluid pump, the fluid tank, and the accumulator are positioned within an idler wheel.

15. The system of claim 12 further comprising a poppet valve.

16. The system of claim 12 further comprising a controller.

17. The system of claim 12 wherein the accumulator is formed within the manifold.

18. The system of claim 12 wherein the actuator is connected directly to the manifold.

* * * * *